United States Patent [19]

Fischle

[11] Patent Number: 4,817,968
[45] Date of Patent: Apr. 4, 1989

[54] AIRBORNE SOUND SEALING MEANS FOR AN OPENING FOR A GEAR SHIFTING ASSEMBLY

[75] Inventor: Rüdiger Fischle, Wiernsheim, Fed. Rep. of Germany

[73] Assignee: Dr. Ing. h.c.F. Porsche Aktiengesellschaft, Stuttgart, Fed. Rep. of Germany

[21] Appl. No.: 49,466

[22] Filed: May 14, 1987

[30] Foreign Application Priority Data

May 14, 1986 [DE] Fed. Rep. of Germany ....... 3616247

[51] Int. Cl.$^4$ .............................................. F16J 15/14
[52] U.S. Cl. ...................................... 277/226; 277/34; 277/97; 277/212 FB
[58] Field of Search ................. 277/30, 34, 34.3, 34.6, 277/97, 226, 212 FB; 403/50, 51; 74/18, 18.1, 18.2

[56] References Cited

U.S. PATENT DOCUMENTS

| 829,546 | 8/1906 | Schou | 277/226 |
| 2,174,504 | 9/1939 | Cole | 277/30 X |
| 2,620,208 | 12/1952 | Patch et al. | 277/30 X |
| 3,971,564 | 7/1976 | Bowen et al. | 277/30 |
| 4,029,324 | 6/1977 | Berkes | 277/30 |

FOREIGN PATENT DOCUMENTS

| 2353417 | 5/1975 | Fed. Rep. of Germany . | |
| 878164 | 9/1942 | France | 277/226 |
| 412421 | 8/1974 | U.S.S.R. | 277/30 |
| 25789 | of 1904 | United Kingdom | 277/226 |
| 528359 | 10/1940 | United Kingdom | 277/226 |

Primary Examiner—Robert S. Ward
Attorney, Agent, or Firm—Barnes & Thornburg

[57] ABSTRACT

An airborne-sound sealing means for an opening, particularly of a manual gear shift lever of an automobile that is pivoted in it and is arranged in a cutout on the side of the body. A sound insulating element that tightly encloses the shaft of the gear shift lever and is filled with a medium is arranged in this cutout.

9 Claims, 1 Drawing Sheet

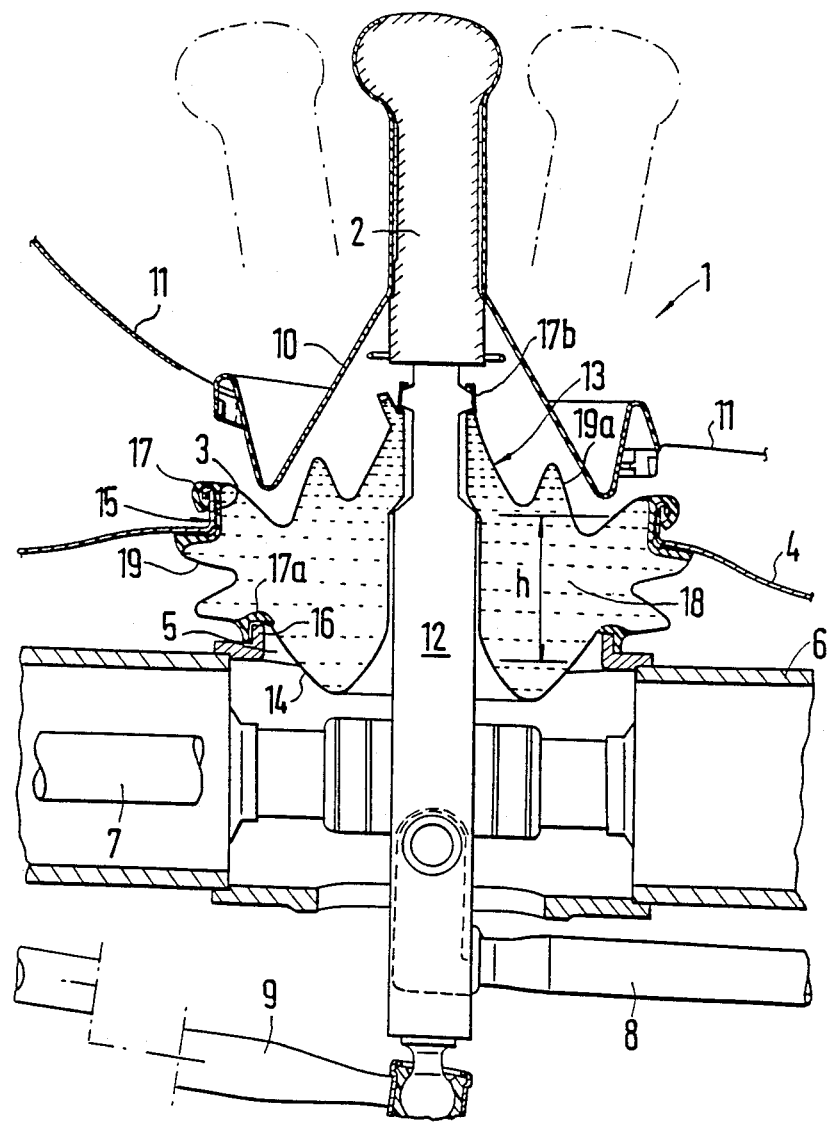

AIRBORNE SOUND SEALING MEANS FOR AN OPENING FOR A GEAR SHIFTING ASSEMBLY

BACKGROUND AND SUMMARY OF THE INVENTION

The present invention relates to an airborne-sound sealing arrangement for an opening in the body of an automobile and a shift lever which extends through this opening.

From German Published Unexamined Patent Application No. 2,353,417, a gear shift lever for a motor vehicle has become known that is arranged in an opening of the body. This gear shift lever is tightly closed off with respect to the interior of the vehicle via bellows that tightly enclose the shift lever. By means of this type of an arrangement of bellows above one another, a sealing-off of the interior of the vehicle with respect to airborne sounds is achieved. However, this is possible only to an insufficient degree, and a disadvantageous structure-borne noise bridge may be created. It is also known to close the opening off with a sound-absorbing part made of a foamed material, which, however, requires an expensive, precisely machined part.

It is an objective of the present invention to provide an improved sound sealing arrangement for an opening for a pivotal gear shift lever in which for conditionally moved parts within an opening, an improved sealing-off of airborne noise with respect to the interior of the vehicle is achieved and a structure-borne noise transmission is also avoided, and in which impairments of the shifting paths are prevented.

This and other objects of the invention are achieved by providing a sound sealing arrangement in which a sound insulting means is arranged in an opening in the vehicle body between a shift lever and the vehicle body. The sound insulating means tightly encloses the shaft of the shift lever, and is filled with a flowable medium.

Advantages achieved by means of the present invention include that because of the reflection of the sound waves at the boundary layer between the surrounding medium of air and the sound-absorbing shell (rubber and fluid), the largest part of the airborne sound is reflected and thus cannot penetrate into the interior of the vehicle. For this purpose, a tight sealing between the cutout on the side of the body and gear shift lever that is moved in it is required.

For this purpose, the shell of the element, irrespective of the position of the gear shift lever, rests tightly against the body. In every position of the gear shift lever, a sufficiently thick layer of the liquid medium will always exist so that over the whole surface of the cutout, an identical sealing-off of airborne noise is ensured.

By means of the relatively soft, flexible design of the medium-filled insulating element, a structure-borne noise transmission between the vibrating unit (such as the center tube) and the body of the vehicle is prevented. No forces and thus no vibrations can be transmitted in the direction of the body. For this purpose, the shell of the element is designed in such a way that the gear shift lever movements are unimpaired and no tight connection exists between the tube and the body. In addition, because of the unstressed filling of the interior space with liquid medium, no tensile stress is created during shifting at the outer shell and excess pressure is prevented in the interior space so that the shifting forces are not impaired.

By means of the flexibly designed element, installation tolerances are absorbed so that the cutout, as well as the opening, need not be aligned precisely with respect to one another, as is required for known sound-absorbing parts made of foamed material arranged in the cutout. The insulating element also makes it possible within certain limits to absorb a shaking of the shift rod by means of the displacing of the liquid medium in the element.

Other objects, advantages and novel features of the present invention will become apparent from the following detailed description of the invention when considered in conjunction with the accompanying drawings.

BRIEF DESCRIPTION OF THE DRAWINGS

The drawing is a partial sectional view of a manual shift lever having an insulating element constructed in accordance with a preferred embodiment of the present invention.

DETAILED DESCRIPTION OF THE DRAWINGS

The airborne-noise sealing means 1 comprises a pivotably disposed gear shift lever 2 that is arranged within a cutout 3 in the motor vehicle body 4 and penetrates openings 5 in a holding tube 6 for a drive shaft 7. Gear shift rods 8 and 9 are coupled to the end side of the shift lever 2. It is contemplated that the shift lever can extend through an opening in a component other than a holding tube for a drive shaft.

The shift lever 2 is connected with a flexible bellows 10 in such a way that on the side of its edge, the bellows 10 is held in an inside bracket 11 and forms a closure in the direction of the interior of the vehicle.

Between the cutout 3 in the vehicle body 4 and the opening 5 in the holding tube 6 and the shaft 12 of the gear shift lever 2, a sound-insulation element 13 is arranged. The sound-insulating element 13 comprises a flexible container filled with a liquid or gaseous medium, the shell 14 of this container being made of a flexible, soft and relatively thin material, such as rubber, for example. For a tight and secure closure of the element 13 at the edge of the cutout 3, at the edge 16 of the opening 5, and at the shaft 12, thickenings 17, 17a and 17b of material are provided at the shell 14 in these fastening areas.

The interior space 18 of the element 13 is filled with a liquid medium, such as oil or a freeze-protected water mixture in such a filling ratio and without the inclusion of air that, during the shifting, no tensile stress occurs in the outside walls of the element 13 and on the inside, no excess pressure can be generated. It is also ensured by this filling ratio that the element 13 in any position of the gear has a fluid level h that is sufficient for the sealing-off of airborne noise.

The area of the element 13, between the cutout 3 on the side of the body 4 and the opening 5, has corrugated ribs 19 so that no tight connection exists between the tube 6 and that body 4 of the vehicle. Also, the shell 14 between the body 4 and the shaft 12 has additional corrugated ribs 19a.

The use of the sound insulating element 13 is also contemplated for the sealing-off of sound from propeller shafts to an enclosed case of a drive unit.

When oils of high viscosity are used in the element 13, in addition to the prevention of the penetration of airborne sound into the interior of the vehicle, a certain amount of damping of the shift lever 12 is also achieved for a shaking lever.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A sound sealing and anti-vibrational insulating gear shift lever mounting means for an opening in a body of an automobile having a shift lever which extends through said opening, comprising:

sound sealing and anti-vibrational insulating means arranged in said opening and between said shift lever and said body, for tightly enclosing a shaft of said shift lever; said sound sealing and anti-vibrational insulating means including an interior unstressed space being filled with a flowable medium without inclusion of air, such that in any movement of the gear shift lever a sufficiently thick layer of flowable medium will exist at the opening to provide sound sealing and anti-vibrational insulation between the gear shaft lever and the body around the opening without tensile forces being created in the interior space and without impairment of shifting forces of the gear shift lever.

2. A sound sealing and anti-vibrational mounting according to claim 1, wherein said sound sealing means includes fastening areas at which said sound sealing and anti-vibrational insulating means is fastened to said lever and said body.

3. A sound sealing and anti-vibrational mounting according to claim 2, wherein said sound sealing and anti-vibrational insulating means has a shell made of a soft material, said shell having localized thickenings at said fastening areas.

4. A sound sealing arrangement according to claim 3, further comprising: a holding tube having an opening; and a cut-out portion in said body, wherein said shift lever is arranged in said opening and extends through said cut-out portion.

5. A sound sealing arrangement according to claim 4, wherein said shell has corrugated ribs which extend between said cut-out portion and said opening.

6. A sound sealing arrangement according to claim 3, wherein said body includes a cut-out portion, and wherein said shell has corrugated ribs between said cut-out portion and said shaft.

7. A sound sealing and anti-vibrational mounting according to claim 1, wherein said sound sealing and anti-vibrational insulating means has an approximately identical fluid level in any position of said shift lever.

8. A sound sealing and anti-vibrational mounting according to claim 1, wherein said fluid medium consists of oil.

9. A sound sealing and anti-vibrational mounting according to claim 1, wherein said fluid medium is a freeze-protected water mixture.

* * * * *